Jan. 23, 1951  J. M. BASH  2,539,112
DEGREASING EQUIPMENT
Filed Sept. 6, 1946  3 Sheets-Sheet 1
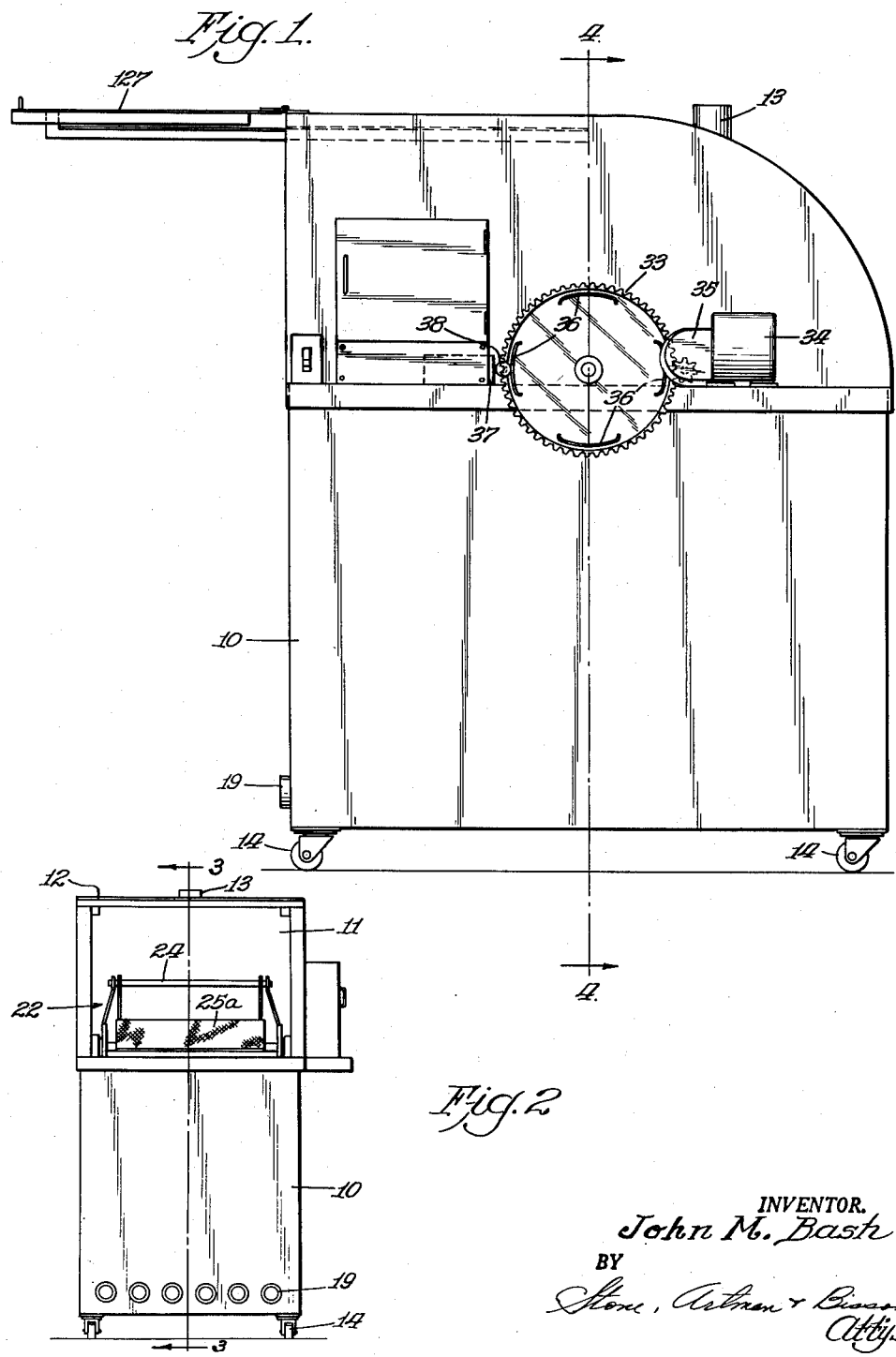
INVENTOR.
John M. Bash
BY
Stone, Artman & Bisson
Attys.

Jan. 23, 1951  J. M. BASH  2,539,112
DEGREASING EQUIPMENT
Filed Sept. 6, 1946  3 Sheets-Sheet 2

INVENTOR.
John M. Bash
BY
Stone, Artman & Bisson
Attys

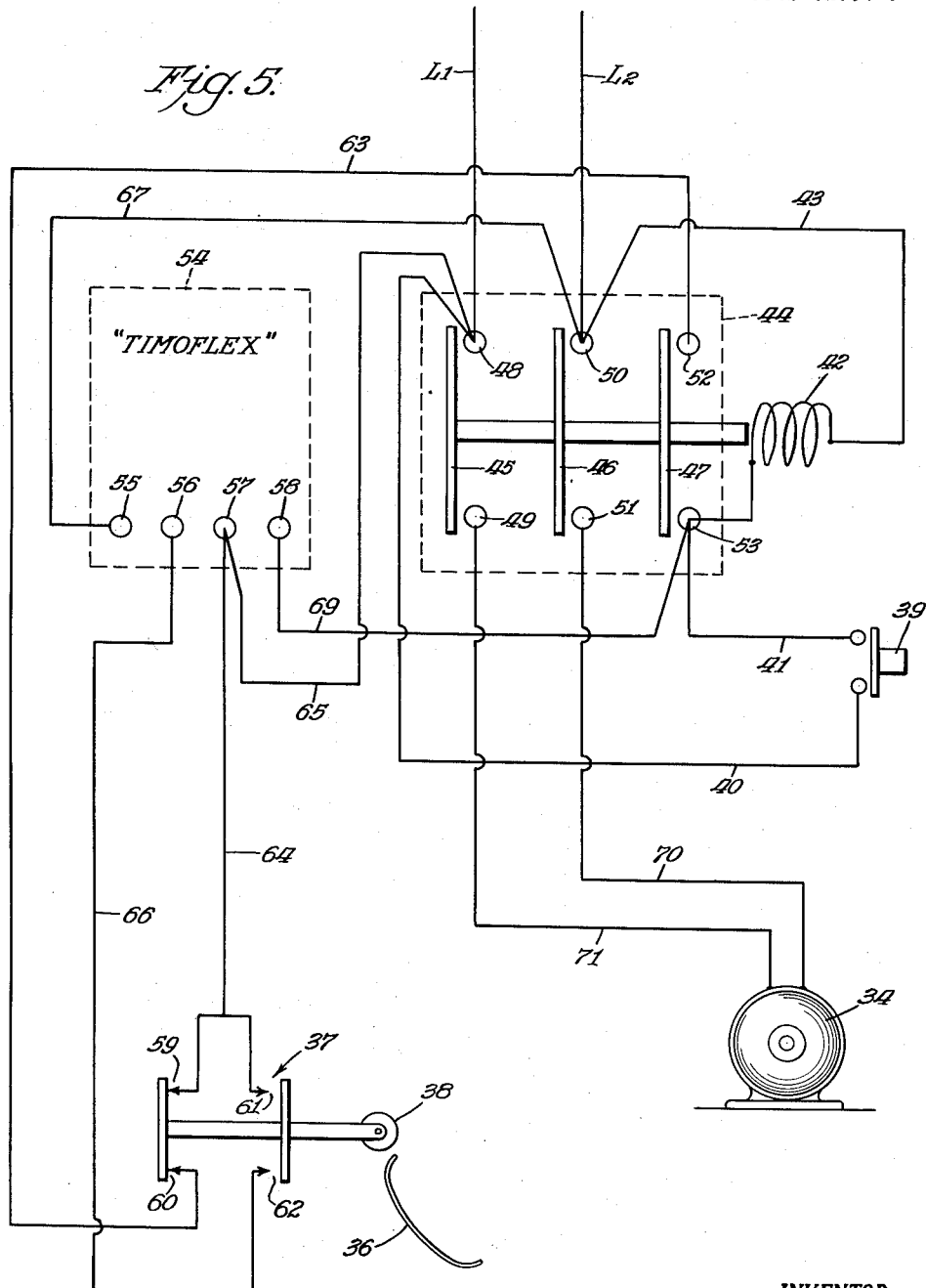

Patented Jan. 23, 1951

2,539,112

UNITED STATES PATENT OFFICE 2,539,112

DEGREASING EQUIPMENT

John M. Bash, Chicago, Ill.

Application September 6, 1946, Serial No. 695,149

4 Claims. (Cl. 202—170)

This invention relates to improvements in degreasing equipment, and one of its objects is to provide, in a compact unit, a degreaser which operates continuously to convey batches of parts to be degreased through a degreasing cycle and back to the starting point, after degreasing, so that one man can load and unload the machine without moving from a given position, while at the same time several batches of parts are progressing through the degreasing cycle.

Another object is to provide at low cost a continuous type degreaser wherein the movement of the parts conveyor is automatically started and stopped periodically, as it proceeds through each cycle—the duration of the stop periods being adjustable by the operator so as to allow enough time during each cycle for the degreased parts to drain thoroughly without slowing the machine down any more than necessary.

In carrying out my invention I mount within a degreasing chamber a continuous conveyor, preferably in the form of a rotor, on which are supported, at uniformly spaced points, a number of receptacles adapted to hold parts which are to be degreased. An atmosphere of vaporous degreasing solvent, such as vaporous tetrachloroethylene, is continuously maintained within the lower part of the chamber so that the several receptacles pass consecutively through the vapor as they move through each cycle of operation. But the upper part of the chamber through which the receptacles pass after leaving the vapor-containing lower portion contains an atmosphere of air having a lower temperature than that of the vapor below, wherefore the vaporous cleaning solvent picked up by the receptacles and the parts contained therein is condensed to liquid form. The liquid solvent condensate drains from the parts as the receptacle moves through the upper part of the chamber and carries with it the dissolved grease and dirt from the processed parts; but a certain amount of time is required for the parts to drain thoroughly and this will vary with variations in the nature of the parts being treated. This means that it is necessary to be able to increase and decrease the duration of draining time if maximum output is to be achieved under all circumstances and thorough draining is to be accomplished when the parts are of such character that more than a minimum draining period is required. For that reason I provide means for varying the duration of the cycle—thus varying the draining time. This can be done by driving the conveyor continuously although at variable speed; but it is very desirable to have the conveyor stop as each receptacle returns to the starting point so that the operator can conveniently remove from the conveyor the receptacles containing degreased parts and replace them with other receptacle containing parts to be degreased.

A preferred embodiment of this invention is illustrated in the accompanying drawings wherein:

Fig. 1 is a side elevational view of a degreaser;

Fig. 2 is a front elevational view;

Fig. 5 is a schematic diagram of circuit connections.

Figure 3:
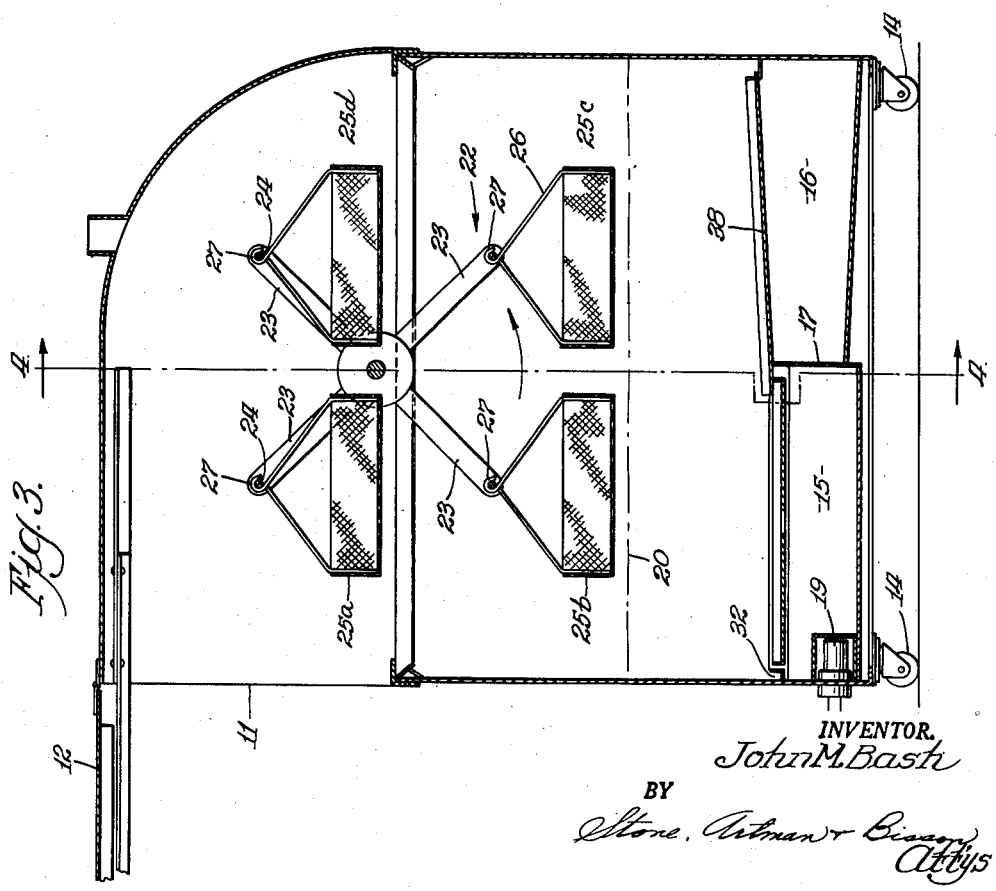
Fig. 3 is a sectional view taken at 3—3 of Fig. 2.

Referring first to Figs. 1–3 inclusive, the degreaser illustrated comprises a housing 10 made principally of sheet metal. Said housing may be of generally rectangular form, save as shown, and preferably is provided with an opening 11 through which the degreaser is loaded and unloaded. A door 12 which may be hinged at the top, as shown, serves as a closure for opening 11 when the degreaser is not in use. A vent 13 at the top of the housing may be connected through a suitable conduit to the outside of the building or the machine may instead be placed under a ventilating hood which will serve to carry away effluent odorous vapors which are lighter than air. In order to render the machine more easily portable from place to place within the shop it may be mounted on casters 14.

The lower portion of the interior of housing 10 is divided into two compartments 15 and 16 by a dividing wall 17 which extends a few inches up from the bottom.

Compartment 15 is a sump for contaminated liquid solvent—which is to say solvent containing oil and dirt from degreased parts; and compartment 16 is a sump for clean liquid solvent. The solvent employed may be trichloroethylene or tetrachloroethylene or, in any event, should be one having a vapor density greater than unity when compared to air at the same pressure.

Disposed within the housing in heat transfer relation to sump 15 are several electric heater units 19 which serve to heat the liquid solvent therein to such an extent as to maintain above the liquid a body of vaporous solvent. But inasmuch as this vapor has a density greater than unity it will not disseminate through the air but will rise to some convenient prescribed level such as that indicated by the broken line 20, provided the temperature of the liquid solvent is suitably regulated. Appropriate means are provided for automatically controlling the electric heaters so as to maintain the vapor at the desired level; but since such control means are old and well known in the art they have not been shown in this instance.

Sump 16, as previously stated, contains clean solvent which will overflow wall 17 into sump 15 whenever the level of the solvent therein rises above the top of said wall. Any solvent that condenses on the walls of the housing will be clean, since it does not contact the parts receptacles or the parts therein, and will flow down either directly into sump 16 or will be intercepted by a gutter 32 which extends along three sides of sump 15 and empties into sump 16.

Journaled in pillow blocks 30 and 31, which are supported by the side walls of housing 10, is a shaft 21 on which is fixedly mounted a continuous conveyor in the form of a rotor 22. This comprises, preferably, four pairs of radially extending arms 23; and between the ends of each pair is connected a bar 24—there being four such bars spaced in quadrature in the structure illustrated.

Suspended from each bar 24 is a backet-like receptacle 25a—25d having each a pair of bails 26, one at each end, provided with hooks 27 at their respective upper extremities by means of which the receptacles are detachably connected to their supporting bars. The receptacles 25 preferably are perforated both at the bottom and sides and conveniently may be made of expanded metal. They are adapted to receive and hold parts to be degreased and the perforations enable the liquid solvent condensate to drain off.

Figure 4:
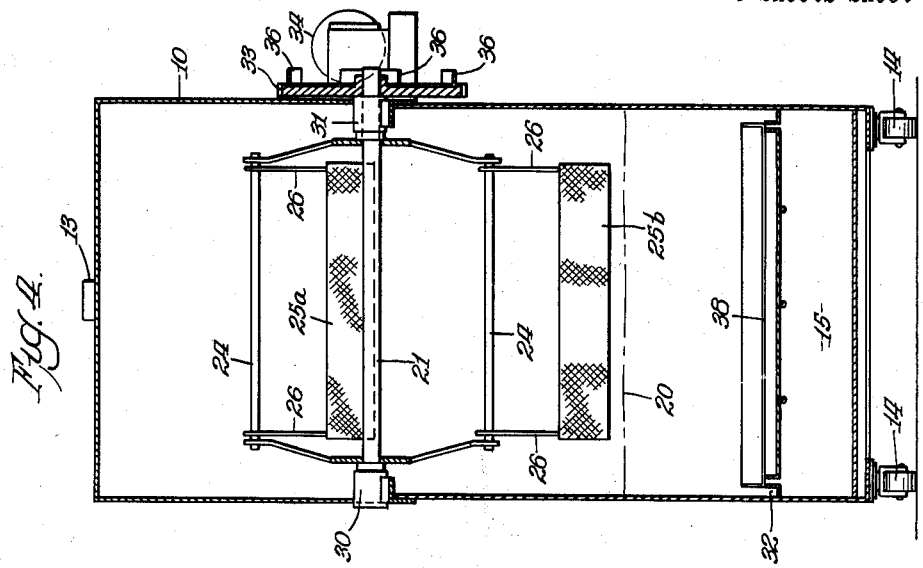
Fig. 4 is a sectional view taken at 4—4 of Fig. 1.

Referring to Figs. 1 and 4, there is connected to one end of shaft 21 a spur gear 33 which is arranged to be driven by an electric motor 34 through the medium of suitable speed reduction gearing 35. Attached to the outer face of gear 33 are four cam members 36 arranged in quadrature about the axis of rotation of shaft 21. These cams are adapted to actuate, consecutively, a limit switch 37 which is provided with a cam roller 38 for engaging the cams. The function of limit switch 37 will be explained in conjunction with the circuit diagram, Fig. 5.

In operation, the rotor 22 is rotated through consecutive steps of 90 degrees each and is stopped as each receptacle arrives at a convenient position for removal from the rotor through opening 11. As depicted in Fig. 3, receptacle 25a has arrived at that position. The rotor moves counterclockwise, as viewed in Fig. 3; and as will be seen from an examination of that figure, receptacle 25b is about to enter the zone occupied by the vaporous body of degreasing solvent—which is to say, the zone below the upper level 20 of the vapor body. At the same time, receptacle 25c has just emerged from the vapor while receptacle 25d has been elevated substantially above the vapor level. In this position the motor remains at rest for a predetermined period of time ranging from say fifteen seconds to as much as three minutes—depending largely upon the nature of the parts being degreased. This not only allows time for removal and replacement of the receptacle at the opening 11—which usually can be accomplished within the minimum period, irrespective of the nature of the parts being processed—but what is more important it allows time for the solvent to drain off the treated parts after emergence from the vapor zone. During the idle period when receptacle 25a is being withdrawn and replaced, receptacle 25d is draining; and the latter will be ready for removal following the next 90 degree rotation of the rotor. Thus, each receptacle, in turn, is allowed to drain for a suitable period of time, the duration of which is variable by the operator—and during each such period the atendant removes a receptacle containing degreased parts and replaces it with another containing parts to be degreased. The drippings from the parts-carrying receptacles fall either directly into sump 15 or onto a drain plate 38 which overlies sump 16 and thus prevents contaminated solvent entering the latter sump.

Referring to Fig. 5, which is a circuit diagram of the control system, current for operating motor 34 is supplied by incoming lines $L_1$, $L_2$. Operation is initiated by depressing a start button 39 which closes a circuit from line $L_1$ through conductors 40 and 41, solenoid winding 42 and conductor 43 to line $L_2$. The resultant energization of coil 42 causes actuation of a contactor 44 which has three simultaneously movable blades 45, 46 and 47. Fixed contacts 48 and 49 are bridged by blade 45 while fixed contacts 50 and 51 are bridged by blade 46. Thus, a circuit is completed from lines $L_1$, $L_2$ to motor 34 via conductors 70 and 71. Provision must be made for continuing the energization of coil 42 in order to keep contactor 44 closed and motor 34 running after pushbutton 39 is released. This is accomplished by means of an automatic timing device 54 known as a "Timoflex." The latter is a well known commercially available device and need not be described in detail.

Four terminals are shown on "Timoflex" 54 and marked 55 to 58 inclusive. Limit switch 37 has two sets of contacts 59, 60 and 61, 62 respectively. The first of these are closed, as shown in Fig. 5, when cam roller 38 is not engaged by one of the four cams 36 whereas the latter contacts are closed when roller 38 is so engaged. Assuming contacts 59, 60 to be closed, the operation of contactor 44 completes a holding circuit for coil 42 from terminal 53 through blade 47, terminal 52, conductor 63, contacts 59, 60, conductor 64, terminal 57 and conductor 65 to line $L_1$. The other terminal of coil 42 is permanently connected to line $L_2$ through conductor 43. Motor 34 will, therefore, continue to run until contacts 59, 60 are broken by virtue of roller 38 being engaged by the next succeeding cam 36. Actuation of the limit switch by a cam 36 closes contacts 61, 62 and immediately thereafter opens contacts 59, 60. Contacts 61, 62 close a circuit from $L_1$ via conductors 65, 66 and 68 to terminal 56 which is connected through the internal mechanism of the "Timoflex" to terminal 55 which, in turn, is connected via conductor 67 to $L_2$. This sets the "Timoflex" into operation for the purpose of restarting motor 34 after the lapse of a predetermined period of time—which period can be varied in duration by adjusting the "Timoflex." Following termination of the predetermined rest period, the "Timoflex" bridges terminals 57 and 58 and thus closes a circuit from $L_1$ via conductors 65 and 69 to terminal 53 and thence through coil 42 and conductor 43 to $L_2$. This causes reactuation of contactor 44 and is effective to restart motor 34, which will continue to run until solenoid coil 42 is again de-energized by the breaking of contacts 59, 60 as a result of the next cam 36 engaging roller 38 and actuating the limit switch. Once started, the cycle of operation is continuous and is interrupted only by opening a switch in line $L_1$, $L_2$ or at some other convenient point.

Having described my invention, what I claim as new and wish to secure by Letters Patent of the United States is:

1. A degreaser comprising a chamber, means for maintaining in said chamber a vaporous body of degreasing solvent having a vapor density greater than unity, a continuous conveyor extending into said chamber and driven from a shaft, a plurality of receptacles carried in said conveyor in linearly spaced relation, a motor drivingly connected to said shaft, a power supply, a circuit containing a timer and holding switches connecting the power supply to the motor for automatically starting the motor after the flow of current through the circuit has been broken and after a selected lapse of time, a normally closed disabling switch in said circuit, an arm on said switch positioned in spaced relationship with the shaft and operable to open the switch, and cam elements equal in number to the receptacles on the conveyor and spaced from each other proportionately to the spacing of the receptacles from each other and mounted on the shaft so as to be successively engageable with the switch arm for opening the circuit thereby stopping the motor and actuating the timer for re-closing the circuit after a lapse of time.

2. A degreaser comprising a sump having a depth such that degreasing liquid may be vaporized in the bottom thereof and a vapor zone created thereabove having a substantial depth with the top of the vapor zone substantially below the top edges of the sump, a rotatable shaft supported on two opposite top edges of the sump and over the sump, a plurality of radiating arms equally spaced on said shaft, a basket for work to be degreased on each arm, a motor and drive elements for rotating the shaft, a power supply, a circuit containing a timer connecting the power supply to the motor for automatically starting the motor after the flow of current through the circuit has been broken and after a selected lapse of time, a normally closed disabling switch in said circuit, an arm on said switch positioned in spaced relationship with the axis of the shaft and operable to open the switch and start the timer, and cam elements equal in number to the radiating arms on the shaft and equally spaced about on the shaft and engageable successively with the switch arm for opening the circuit thereby stopping the motor and actuating the timer for re-closing the circuit and starting the motor after a lapse of time.

3. A degreaser comprising a sump having a depth such that degreasing liquid may be vaporized in the bottom thereof and a vapor zone created thereabove having a substantial depth with the top of the vapor zone substantially below the top edges of the sump, a rotatable shaft supported on two opposite top edges of the sump and over the sump, a plurality of radiating arms equally spaced on said shaft, a basket for work to be degreased on each arm, a drive gear on said shaft, an electric motor drivingly connected to said gear, a power supply, a circuit containing a timer connecting the power supply to the motor for automatically starting the motor after the flow of current through the circuit has been broken and after a selected lapse of time, a normally closed disabling switch in said circuit, an arm on said switch positioned adjacent the periphery of the gear on the shaft and operable to open the switch and thereby start the timer, and cam elements equal in number to the radiating arms on the shaft and equally spaced about the periphery of the gear so as to be successively engageable with the switch arm for opening the circuit thereby stopping the motor and actuating the timer for reclosing the circuit and starting the motor after a lapse of time.

4. The degreaser of claim 1 together with a cover removably mounted on the top edges of the sump for enclosing those receptacles at a level above the top edges of the sump and preventing vapors carried above the edges of the sump by the receptacles from flowing over the top edges of the sump.

JOHN M. BASH.

REFERENCES CITED

The following references are of record in the file of this patent:

UNITED STATES PATENTS

| Number | Name | Date |
|---|---|---|
| 1,289,326 | Walker et al. | Dec. 31, 1918 |
| 2,124,460 | Cary et al. | July 19, 1938 |
| 2,155,271 | Jones | Apr. 18, 1939 |
| 2,158,621 | Edhofer et al. | May 16, 1939 |
| 2,248,662 | Edhofer et al. | July 8, 1941 |
| 2,273,939 | Dammers | Feb. 24, 1942 |
| 2,280,811 | Edhofer et al. | Apr. 28, 1942 |
| 2,358,507 | Haberstump | Sept. 19, 1944 |
| 2,366,949 | Woppman et al. | Jan. 9, 1945 |
| 2,369,050 | Helfenstein | Feb. 6, 1945 |
| 2,386,079 | Weiskopf | Oct. 2, 1945 |
| 2,416,575 | Cosway | Feb. 25, 1947 |